Nov. 27, 1923.  
W. A. JOHNSON  
TIRE PROTECTOR  
Filed Jan. 16, 1922   2 Sheets-Sheet 1

Inventor  
William A. Johnson  
By Daniel J. Brennan  
Attorney

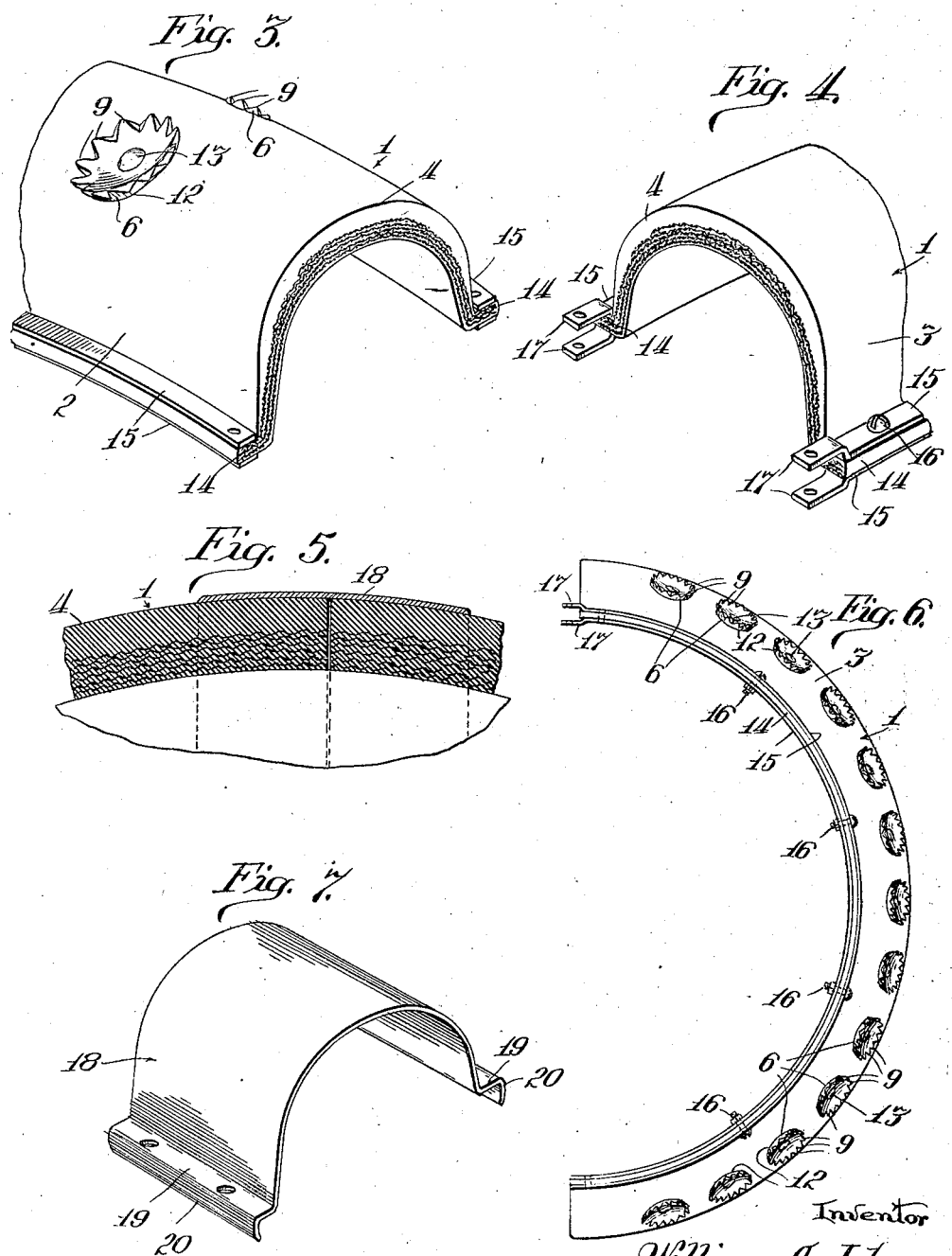

Patented Nov. 27, 1923.

1,475,266

UNITED STATES PATENT OFFICE.

WILLIAM A. JOHNSON, OF CHICAGO, ILLINOIS.

TIRE PROTECTOR.

Application filed January 16, 1922. Serial No. 529,681.

*To all whom it may concern:*

Be it known that I, WILLIAM A. JOHNSON, a citizen of the United States, residing at Chicago, in the county of Cook and State of Illinois, have invented a new and useful Improvement in Tire Protectors, of which the following is a specification.

This invention relates to improvements in tire protectors.

It is an object of the invention to provide a detachable shoe for a tire which can readily be secured in place or removed, and which will not only serve to protect the tire against excessive wear but which at the same time will prevent the skidding or other undesired movement of the vehicle.

It is also an object of the invention to provide an anti-skidding device which will be less destructive of the tires and the pavement than the known anti-skidding devices, as chains and the like and which at the same time also is free of the other disadvantages inherent to anti-skidding chains or similar devices. The device of the present invention in noiseless and less injurious to the pavement or to the body of the vehicle itself than the devices which have been in use.

Figure 1:
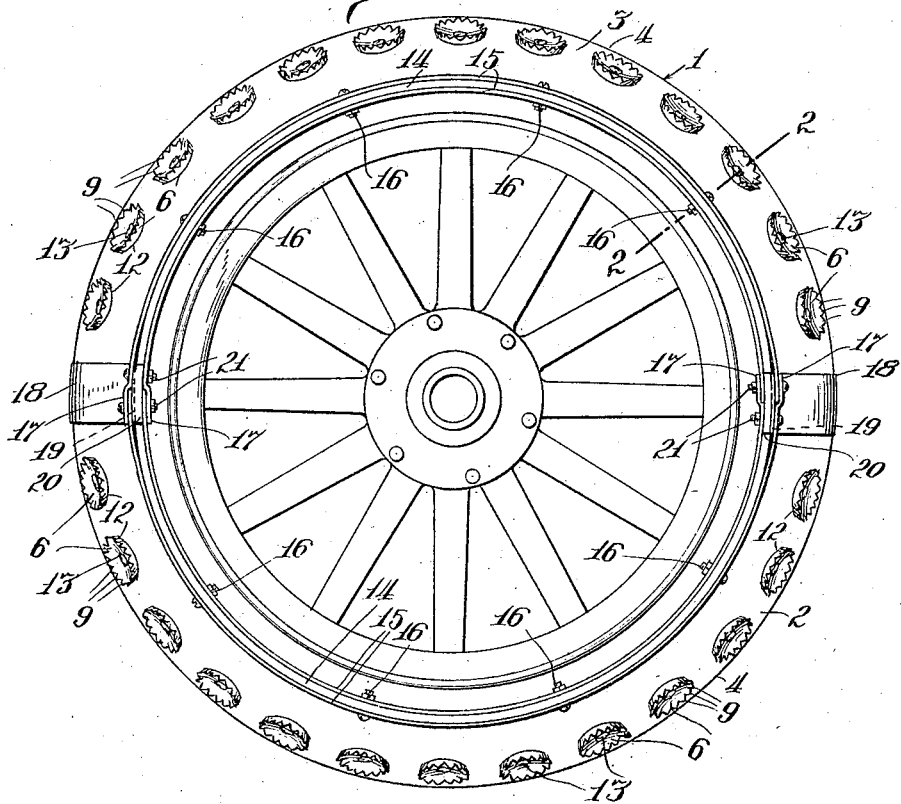
Figure 2:
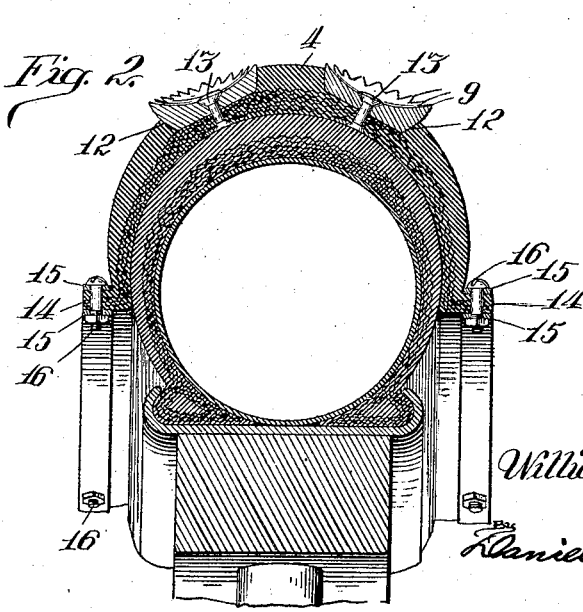

With these and other other objects in view, an embodiment of the invention is illustrated in the accompanying drawing in which Fig. 1 is a side elevation of a wheel equipped with the protector, Fig. 2 shows on a larger scale a cross-section through a tire in combination with the protector, Figs. 3 and 4 are perspective views of the ends of the protector which are to be joined, Fig. 5 is a section through the medial plane of the protector, and through the connecting sleeve for two ends of the same, Fig. 6 is a side elevation of a protector segment, and Fig. 7 shows in perspective the joining sleeve.

The wheel on which the protector or anti-skidding device is mounted, is shown by way of example here as comprising a hub, spokes, fellies, and a rim, the tire consisting of an outer casing and inner tube. The construction of these elements may be in any form desired and does not form part of the present invention.

The protector 1 surrounds the tread portion of the tire and a large part of the lateral surfaces of the same and is composed of a plurality of ring segments, two of which are shown at 2 and 3 which supplement each other to form a complete ring. The cross section of the protector resembles somewhat that of an ordinary tire casing, the tread portion 4 being considerably stronger than the lateral wall portions, and the rubber of the tread portions being reinforced in a known way by means of fabric. This tread portion, the inner surface of which corresponds to the outer surface of the tire, also is equipped with rigidly inserted elements to prevent the skidding of the wheel on slippery pavements and to reinforce the protector. These friction creating elements are shown here in the form of washers or discs 6 with a plurality of points or with serrated edges 9 which project beyond the central part of the disc, the upper surface of the disc therefore being dished or concave.

It will also be seen from Fig. 2 that the thickness of these friction producing elements is not uniform, and that a circumferential portion of the same located near the lateral walls of the protector is higher than the diametrically opposite portion. This construction has the effect of causing the serrated edges to be firmly forced into engagement with the pavement when the tire owing to the weight supported thereby is slightly flattened on its tread portion.

The protector is provided with a plurality of circular recesses with approximately conical walls 12 which serve as seats for the friction producing discs or washers 6. Any desired means of attachment for these washers or discs may be selected. They are shown here to be secured to the body of the protector by means of rivets 13, the inner ends of which are provided with smaller discs in engagement with the inner surface of the tire protector in order to distribute the pressure exerted by the friction producing elements over a larger surface on the tread surface of the tire and to prevent injury of the tire.

In order to attach these protector segments to each other and to secure them to the tire at the same time, the lateral wall portions of the protector are each equipped with a laterally projecting flange 14 extending over the circumferential length of the segment and projecting on each side of the same. These flanges 14 serve for stiffening and reinforcing the protector body and at the same time they serve as supports for additional reinforcing elements in the form of segmental rings or flat bars 15 which are secured by bolts 16 or the like to upper and lower surface of the flanges.

Figs. 3, 4 and 6 indicate that each of the segments 2 of the protector has two of these segmental bars 15 on each side and that the ends 17 of these reinforcing bars near one end of the protector segment project in circumferential direction beyond the segment, while at the other end of the segment the bars 15 terminate flush with the segment. The projecting ends 17 of the reinforcing bars, Fig. 4 are slightly offset, the inner bars projecting inwardly and the outer bars outwardly whereby the space between the projecting ends of these bars is considerably larger than the thickness of the flange 14 on the protector to which they are fastened. The width of the fork produced in this way by the projecting ends 17 is not only large enough to receive the ends of the reinforcing portions 15 of the abutting segment 2, but also to receive a flange of a protector sleeve 18 which is placed over the butt joints of adjacent protector segments as shown in Figs. 5 and 7. This sleeve 18 may consist of some pliable metal or other pliable material so as to be shaped to hug closely the surface of the protector. The sleeve 18 is provided with flanges 19 which project laterally so as to overlie the top surface of a reinforcing flange 15 on the protector segment, and the lateral flange portions 19 are continued by radial flange portions 20 adapted to cover the lateral surfaces of the flange portions 14 and 17 at the joints of the segments. The sleeve 18 serves for reinforcing the entire protector structure and at the same time it prevents the entrance of dirt and other impurities into the slight space remaining between adjacent or abutting protector segments. The ends 17 of the reinforcing flanges 14 and the flanges 19 of the sleeve have openings through which the holding bolts 21 may extend, whereby the entire device may quickly and readily be secured in assembled condition to any inflated tire.

In order to attach the protector the wheel may be jacked up slightly (although this may not be necessary) to permit the lower segment to be placed below the wheel and in engagement therewith whereupon the upper segment is placed from the top into corresponding engaging position with the tire, the sleeves being inserted with their flanges bridging the ends of the reinforcing bars on the protector, the holding bolts are then inserted through the bolt holes which are in register with each other, and tightened.

The protector will lengthen the life of the tire materially by rendering it practically proof against puncture and it will greatly increase the adhesive power of the wheel on the pavement so as to effectively protect the car against skidding.

I claim:

A device of the character described, comprising a protector of pliable material composed of a plurality of segments having tread portions and lateral wall portions, reinforcing flanges on the lateral wall portions, reinforcing bars for said flanges at the top and bottom thereof, means for preventing entrance of impurities into the joints of said segments, and connecting elements extending through said bars and means.

In testimony whereof, I affix my signature in the presence of two witnesses at 36 W. Randolph St., Chicago, Illinois.

WILLIAM A. JOHNSON.

Witnesses:
DANIEL A. BRENNAN,
IRENE MARTIN.